(12) United States Patent
Biancuzzi et al.

(10) Patent No.: US 11,784,539 B2
(45) Date of Patent: Oct. 10, 2023

(54) ASSEMBLY COMPRISING A COMPONENT ROTATABLE ABOUT A ROTARY AXIS FOR AN ACTUATING DRIVE, AND A SENSOR ELEMENT ATTACHED TO THE ROTATABLE COMPONENT

(71) Applicant: Minebea Mitsumi Inc., Nagano (JP)

(72) Inventors: Giovanni Biancuzzi, Freiburg (DE); Felix Blaser, Villingen-Schwenningen (DE); Uwe Schäfer, Rottweil (DE); Michael Bruckhoff, Tennenbronn (DE)

(73) Assignee: Minebea Mitsumi Inc., Nagano (JP)

( * ) Notice: Subject to any disclaimer, the term of this patent is extended or adjusted under 35 U.S.C. 154(b) by 144 days.

(21) Appl. No.: 17/533,713

(22) Filed: Nov. 23, 2021

(65) Prior Publication Data
US 2022/0173637 A1    Jun. 2, 2022

(30) Foreign Application Priority Data
Nov. 30, 2020 (DE) .......................... 102020131667.4

(51) Int. Cl.
*H02K 11/215*    (2016.01)
*B29C 65/08*    (2006.01)
(Continued)

(52) U.S. Cl.
CPC ............ *H02K 11/215* (2016.01); *B29C 65/08* (2013.01); *F16H 55/17* (2013.01); *H02K 7/116* (2013.01);
(Continued)

(58) Field of Classification Search
CPC ...... H02K 11/215; H02K 7/116; H02K 23/66; H02K 15/00; H02K 11/21; H02K 15/14; B29C 65/08; B29C 65/18; B29C 65/606; B29C 66/1122; B29C 66/5324; B29C 66/5326; B29C 66/61; B29C 66/71;
(Continued)

(56) References Cited

U.S. PATENT DOCUMENTS 6,155,126 A * 12/2000 Vogt ........................ F16H 61/32
74/335
6,367,344 B1 * 4/2002 Vogt ........................ F16H 59/70
74/335
(Continued)

FOREIGN PATENT DOCUMENTS

| DE | 112016000797 | 10/2017 |
|---|---|---|
| JP | 2012244851 | 10/2012 |
| JP | 2014200128 | 10/2014 |

*Primary Examiner* — John K Kim
(74) *Attorney, Agent, or Firm* — Grossman, Tucker, Perreault & Pfleger, PLLC; Steven J. Grossman

(57) ABSTRACT

The disclosure relates to an assembly comprising a component rotatable about a rotary axis for an actuating drive comprising a sensor element attached to the rotatable component. The rotatable component has a support surface from which a fixing element protrudes in parallel to the rotary axis. The sensor element includes an opening. The sensor element is arranged on the support surface in such a manner that the fixing element penetrates the opening. A surface of the sensor element adjacent to the opening has a structure. A top portion of the fixing element is in interlocking engagement with the structure so that the attached sensor element is connected to the component in a torque-resistant manner.

11 Claims, 8 Drawing Sheets

(51) Int. Cl.
  *F16H 55/17*    (2006.01)
  *H02K 7/116*    (2006.01)
  H02K 23/66    (2006.01)
  B29L 15/00    (2006.01)

(52) U.S. Cl.
  CPC ........ *B29L 2015/003* (2013.01); *H02K 23/66* (2013.01)

(58) Field of Classification Search
  CPC ............ B29C 66/7392; B29C 66/7394; B29C 66/8322; F16H 55/17; B29L 2015/003; B29L 2031/7498; G01D 5/145; G01P 3/487; F16B 17/00; F16B 19/04; G01B 7/30
  USPC ....................................................... 310/68 R
  See application file for complete search history.

(56) References Cited

U.S. PATENT DOCUMENTS

| | | | |
|---|---|---|---|
| 2010/0001719 A1 | 1/2010 | Kikuchi et al. | |
| 2013/0104682 A1* | 5/2013 | Schneider | F16H 1/22 74/421 A |
| 2016/0241108 A1* | 8/2016 | Kimura | H02P 6/16 |
| 2018/0009476 A1 | 1/2018 | Takayanagi | |
| 2022/0173637 A1* | 6/2022 | Biancuzzi | B29C 65/606 |

* cited by examiner

ASSEMBLY COMPRISING A COMPONENT ROTATABLE ABOUT A ROTARY AXIS FOR AN ACTUATING DRIVE, AND A SENSOR ELEMENT ATTACHED TO THE ROTATABLE COMPONENT

FIELD

The present disclosure relates generally to electromotive actuating drives and, more particularly, to an assembly for an actuating drive comprising a component rotatable about a rotary axis, and a sensor element attached to the rotatable component, and a method of attaching a sensor element to a component of an actuating drive rotatable about a rotary axis.

BACKGROUND

Small electric motors, such as brushless DC motors (BLDC motors) are used, amongst others, in the automotive industry and in automation, for example, as a servo motor, fan motor or drive for actuators, such as flap actuators or valves, for example, needle valves. In such electric motors, or actuating drives, sensor elements often need to be attached to rotatable components, for example gears. For example, a magnet can be arranged on an output gear of an electric motor to determine, by means of a Hall sensor, based on the magnetic field generated by the magnet, the position of the output gear, for example to determine the position of an actuating element coupled to the output gear.

To attach the magnet on the output gear, the latter can be insert injection molded by means of an injection molding method or adhesively glued to the output gear. However, the materials used for making such magnets are often very brittle. There is therefore an increased risk of the magnet getting damaged when it is directly insert molded or adhesively glued. Moreover, attachment by means of adhesive gluing may be impracticable, for example, in an automated series production.

SUMMARY

Example

An assembly comprising a component rotatable about a rotary axis for an actuating drive comprising an electric motor and a sensor element attached to the rotatable component are provided. The rotatable component comprises a support surface from which a fixing element protrudes in parallel to the rotary axis. The sensor element has an opening. The sensor element is arranged on the support surface in such a manner that the fixing element penetrates the opening. A surface of the sensor element adjacent to the opening has a structure. A top portion of the fixing element is in interlocking engagement with the structure so that the attached sensor element is attached to the component in a torque-resistant manner.

The rotatable component and the sensor element to be fixed can correspond to the rotatable component and the sensor element to be fixed of the assembly according to the present disclosure described below. The rotatable component can be, for example, a gear of an actuating drive, in particular an output gear. The sensor element to be fixed can be, for example, a magnet used to determine the position of the rotatable component. In particular, the position of the rotatable component allows the position of an actuator, for example a flap actuator or valve, to be derived, which can be used with the actuating drive.

The assembly according to the present disclosure comprising the interlocking engagement is compatible with automated series production which can be a cost advantage in the production, for example, as against adhesively glued assemblies. The assembly according to the present disclosure is also compatible with available low-cost magnets, such as sintered or plastic-bonded neodymium-iron-boron magnets, since the interlocking engagement of the sensor element with the rotatable component on the surface adjacent to the opening minimizes stresses within the magnet. This minimizes the risk of the available low-cost magnets rupturing which are often brittle.

The assembly can be produced with high efficiency and reliability and a low risk of damaging the magnet.

According to some examples, the structure in the surface of the sensor element is adjacent to the opening. This allows, for example, by deforming the top portion of the fixing element, to effectively introduce some material of the fixing element into the structure. This allows an efficient and strong connection between the top portion of the fixing element and the structure by means of the interlocking engagement.

The structure can comprise a recess in the surface adjacent to the opening which does not have a continuous rotation symmetry about the rotary axis. This improves the loading strength of the interlocking engagement of the top portion of the fixing element with the structure against rotation. In particular, edges of the recess which are radially oriented, i. e. perpendicular to the direction of rotation, and thus break the continuous rotation symmetry, can improve the torque resistance of the assembly. Material of the top portion of the fixing element introduced into the structure can also help to achieve radially and axially backlash-free fixing of the sensor element on the rotatable component.

The structure can also comprise a plurality of recesses in the surface adjacent to the opening and arranged in the circumferential direction about the opening. Recesses can be cost-effectively produced with available techniques of series production, such as, for example, drilling, milling, filing or sawing.

The recess can comprise a blind hole or a plurality of blind holes in the surface adjacent to the opening. Blind holes can be cost-effectively produced by means of drilling, for example. A blind hole or a plurality of blind holes can have a diameter in the range of at least 0.3 mm to 3 mm, in particular from 1 to 2 mm. The interlocking engagement of the fixing element with a blind hole or a plurality of blind holes of this depth affords sufficiently load-resistant, torque-resistant fixing of the sensor element on the rotatable component, for example for use in an actuating drive with an electric motor designed as a small motor without essentially compromising the structural integrity of the sensor element.

According to a further example, the recess comprises a groove or a plurality of grooves on the surface adjacent to the opening. Grooves can comprise longer edges, for example when compared to blind holes, and thus improve the connection between the top portion of the fixing element and the surface of the sensor element adjacent to the opening. According to an example, the groove extends on the surface adjacent to the opening outwardly from the surface. This enlarges those edges which are oriented in the radial direction and can thus improve torque resistance and thus the loading strength of the connection along the azimuthal direction perpendicular to the radially extending edges.

The fixing element can comprise a thermoplastic material. This can be deformable at a lower pressure or at a lower temperature than the sensor element. This enables the top portion of the fixing element being deformed and/or plasticized without deforming or plasticizing the sensor element. This helps to avoid stresses within the sensor element and to minimize the risk of the sensor element rupturing.

The fixing element can be integrally formed with the rotatable component. This can help to improve a loading strength of the attachment of the sensor element on the rotatable component, in particular a tensile strength in the axial direction and resistance against tilting.

The fixing element can extend along the rotary axis. This can help to minimize a torque acting on the attachment of the sensor element at the rotatable component when the rotatable component is rotated and thus the risk of the attachment rupturing.

The opening can comprise a circular cross-section. An opening having a circular cross-section can be produced in a cost-effective manner with the aid of techniques of series production, such as drilling. The center point of the surface adjacent to the opening can be positioned in the opening. In particular, the rotary axis can extend through the center point of the surface adjacent to the opening. This can help to minimize a torque acting on the attachment of the sensor element on the rotatable component when the rotatable component is rotated and thus the risk of the attachment rupturing.

According to some examples, the rotatable component has a cavity in which at least a portion of the sensor element is arranged. The cavity can also be used to define exact positioning of the sensor element on the support surface. Moreover, the cavity can act as a radial fixing of the sensor element and/or as a means of securing the sensor element against tilting with respect to the rotatable component.

The rotatable component can have a locating surface that is inclined with respect to the support surface and in contact with the sensor element. The locating surface can improve the preciseness of positioning the sensor element with respect to the rotatable component. For example, a plurality of contacts between the sensor element and a plurality of support surfaces can form a three-point support. Moreover, the locating surfaces can be in frictional engagement with the sensor element to improve its torque resistance. The frictional engagement can be achieved, for example, by pressing the sensor element against one or more locating surface(s) while establishing the interlocking engagement between the top portion of the fixing element and the surface adjacent to the opening. In such examples, the locating surface, in combination with the interlocking engagement, can also achieve axial fixing of the sensor element on the rotatable component and can improve its radial fixing and securing against tilting with respect to the rotary axis. In particular, the locating surface helps to achieve backlash-free radial and/or axial fixing. The locating surface can be formed at an edge of the cavity and/or at an edge of the support surface. The attached sensor element can have a contact surface in contact with the locating surface is arranged at an oblique angle to the surface adjacent to the opening on an outer surface of the attached sensor element. The contact surface can have the shape of a circular or cylindrical segment. Alternatively, the contact surface can be a planar surface.

According to some examples, the attached sensor element comprises a magnet. The magnet can enable the determination of the azimuthal angle position of the rotatable component, for example, by arranging the assembly in an actuating drive in such a way that the magnet is arranged adjacent to a device adapted to obtain information with respect to an orientation of the magnet. The device can comprise a magnetic-field sensor, for example a Hall sensor. The information on the azimuthal angle position of the rotatable component, in turn, can be advantageously used to determine the position of an actuator, for example a flap actuator or a valve.

In some examples, the rotatable component is a gear that is integrally formed with a hollow shaft. The sensor element can be arranged within the hollow shaft and can be or comprise, for example, a magnet. The sensor element can be arranged in a first axial portion of the hollow shaft, wherein the hollow shaft can comprise a second axial portion for coupling to an actuating element.

Furthermore, an actuating drive having an electric motor is provided. The actuating drive comprises an assembly as described above, wherein the movable component is a gear and the attached sensor element is a magnet having a direction of magnetization. Furthermore, the actuating drive comprises a Hall sensor adapted to obtain information on an azimuthal angle position of the gear. The gear can be, for example, an output gear of the actuating drive. The gear or output gear can be adapted, for example, to be mechanically coupled to a rotor of the electric motor, for example, via a transmission. In some examples, the gear can also be an intermediate gear of the transmission, for example of a speed reduction transmission of an actuating drive driven by the electric motor. The output gear can also be adapted to be mechanically coupled to an actuator and can thus comprise, for example, an output gear having a suitable engagement profile. The magnet can be, for example, a dipole or quadrupole magnet and can have, for example, a cylindrical, annular or disc shape. Preferably, the magnet is diametrically magnetized. The magnet can be, in particular, a rare-earth magnet, for example a sintered or plastic-bonded neodymium-iron-boron magnet (NdFeB). The actuating drive can be adapted, in particular, to control the position of an actuator, for example a valve. The assembly according to the disclosure can allow the determination of the position of the actuator, or the determination of the position of the actuator coupled to the actuating drive.

Preferably, the gear is integrally formed with a hollow shaft and the magnet is arranged within the hollow shaft. The hollow shaft can be, in particular, an output shaft of the actuating drive.

In some examples it is provided that the magnet is arranged in a first axial portion of the hollow shaft. The hollow shaft can then comprise a second axial portion for coupling to an actuator.

Furthermore, the disclosure also provides a method of fixing a sensor element on a rotatable component of an actuating drive rotatable about a rotary axis. The rotatable component comprises a support surface on which a thermally deformable fixing element is arranged which protrudes from the support surface in parallel to the rotary axis. The sensor element to be attached comprises an opening and a surface adjacent to the opening. The surface adjacent to the opening comprises a recess that has no continuous rotation symmetry about the rotary axis. The method comprises arranging the sensor element on the support surface so that the fixing element is introduced through the opening. The method also comprises deforming the top portion of the fixing element so that material of the top portion of the fixing element is introduced into the recess on a surface of the sensor element adjacent to the opening to attach the sensor element on the rotatable component in a torque-resistant manner.

The top portion of the fixing element can have a rotation symmetry about the rotary axis prior to deformation, and the step of deforming can comprise breaking the rotation symmetry. Breaking the rotation symmetry of the fixing element, in combination with the introduction of the material into the recess, can effectively provide torque-resistant securing of the sensor element.

According to some examples, the fixing element is integrally formed with the rotatable component and the method comprises interlockingly engaging the top portion of the fixing element with the surface of the sensor element adjacent to the opening. The fixing element integrally formed with the rotatable component can improve the loading strength of the assembly and, in particular, the tensile strength in the axial direction.

In particular, deforming the top portion of the fixing element can be accomplished by the application of heat and/or pressure. The deformation can comprise at least partially plasticizing the fixing element. The step of at least partially plasticizing the fixing element can be achieved in such a way that plasticizing of the sensor element is avoided. The plasticized material can be effectively introduced into the recess by flowing. Cooling and solidifying of the plasticized material can help to fix and improve the interlocking engagement. Herein, deforming the top portion of the fixing element can be carried out at a pressure and/or temperature at which the sensor element is not melted and/or plasticized. This can help to minimize stresses within the sensor element and the risk of the sensor element rupturing.

Deforming the top portion of the fixing element can be achieved, for example, by means of hot caulking. This technique is advantageously compatible with series production.

Alternatively, deforming the top portion of the fixing element can comprise ultrasonic welding. This technique is also compatible with series production. Alternatively, the deforming can be carried out by means of other techniques, for example, other frictional or vibrational welding techniques, heating element welding and/or laser welding.

According to some examples, the rotatable component comprises a locating surface that is at an oblique angle to the support surface. The method can comprise placing the sensor element against the locating surface. In particular, the method can comprise placing a side surface of the sensor element against the locating surface. The method can also comprise the application of a force to press the sensor element and the locating surface against each other. In particular, deforming the top portion of the fixing element can be carried out prior to or during the application of the force. This can achieve, for example, a press fit of the sensor element on the rotatable component. Moreover, this can improve the axial and/or radial fixing of the sensor element on the rotatable component. In particular, a backlash-free axial and/or radial fixing can be achieved. Also, laying the sensor element against the locating surface can provide securing against tilting of the sensor element with respect to the rotary axis.

The rotatable component can have a cavity, and the step of arranging the sensor element can comprise arranging the sensor element at least in part inside the cavity. The cavity can facilitate radial positioning of the sensor element on the support surface, or can improve its precision. Moreover, the cavity can provide a radial fixing of the sensor element and/or securing against tilting of the sensor element with respect to the rotary axis.

According to some examples, the sensor element comprises a magnet, and the step of arranging the sensor element to be fixed on the support surface comprises aligning the magnet relative to the rotatable component. For example, the magnet can have a direction of magnetization, and the alignment of the magnet can comprise aligning the direction of magnetization. In particular, the magnet can be aligned along a direction perpendicular to the rotary axis. This can help to determine, for example, a zero position when determining the azimuthal angle position of the component.

The rotatable component can be a gear of an electromotive actuating drive, the sensor element can be a magnet, and the method can further comprise the step of arranging the rotatable component in an actuating drive, for example, the step of arranging the gear in a corresponding guide in a housing of the actuating drive and mechanically coupling with the rotor of the electric motor. Arranging the rotatable component in the actuating drive can comprise the step of arranging the magnet adjacent to a magnetic-field sensor. This can facilitate the determination of the position of the gear in the actuating drive by means of the magnetic-field sensor. For example, the position of the actuating drive, or the actuator coupled to the actuating drive, can be determined.

SHORT DESCRIPTION OF THE DRAWINGS

The disclosure will be explained in more detail in the following with the aid of exemplary examples with reference to the accompanying drawings. In the schematic representation of the figures:

FIG. 1b shows a cross-sectional view of the sensor element of FIG. 1a;

FIG. 2b shows a cross-sectional view of the assembly of FIG. 2a;

FIG. 3b shows a cross-sectional view of the assembly of FIG. 3a;

FIG. 5b shows a plan view of the assembly of FIG. 5a;

DETAILED DESCRIPTION OF THE DRAWINGS

Figure 1A:
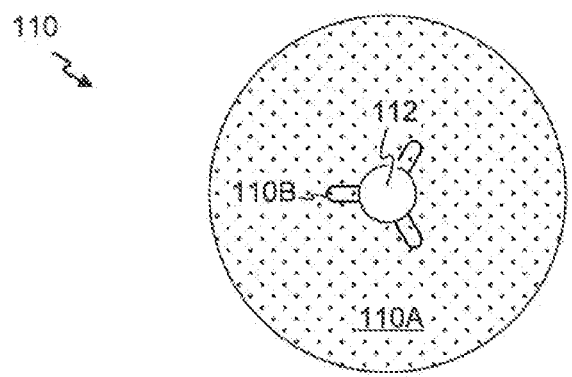
FIG. 1a shows a plan view of a sensor element to be fixed according to an example.
Figure 1B:
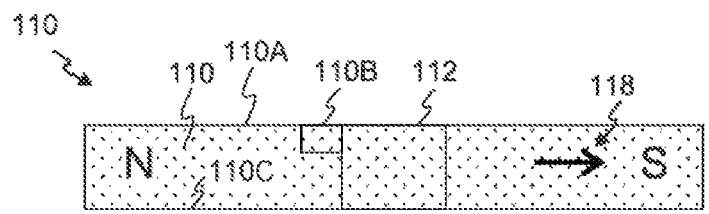
Figure 1C:
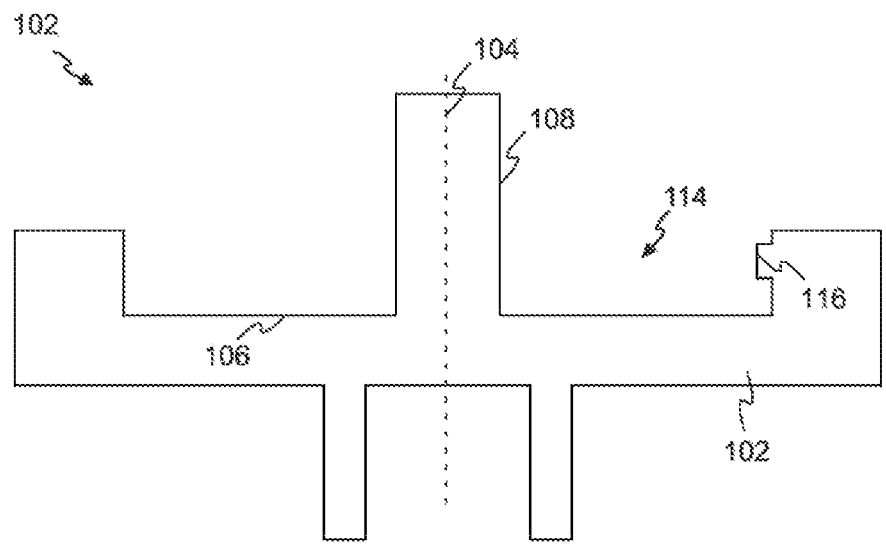
FIG. 1c shows a cross-sectional view of a rotatable component in the form of a gear according to an example.
Figure 2A:
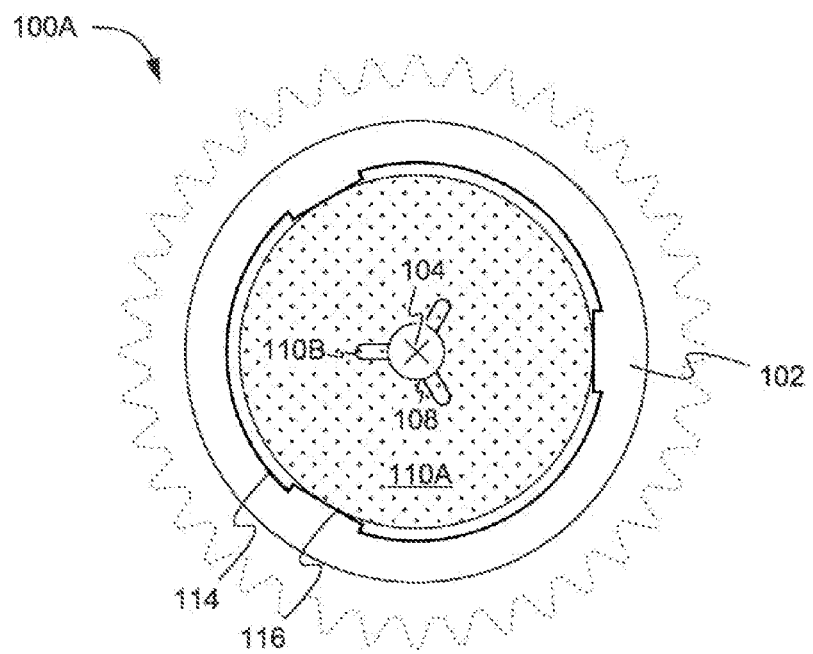
FIG. 2a shows a plan view of an assembly comprising the gear and the sensor element to be fixed of FIGS. 1a to 1c.
Figure 2B:
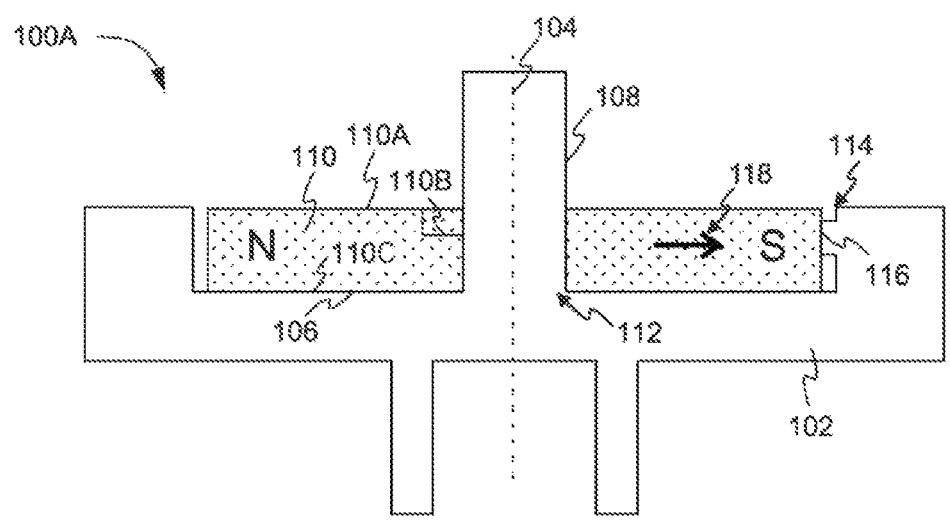
Figure 3A:
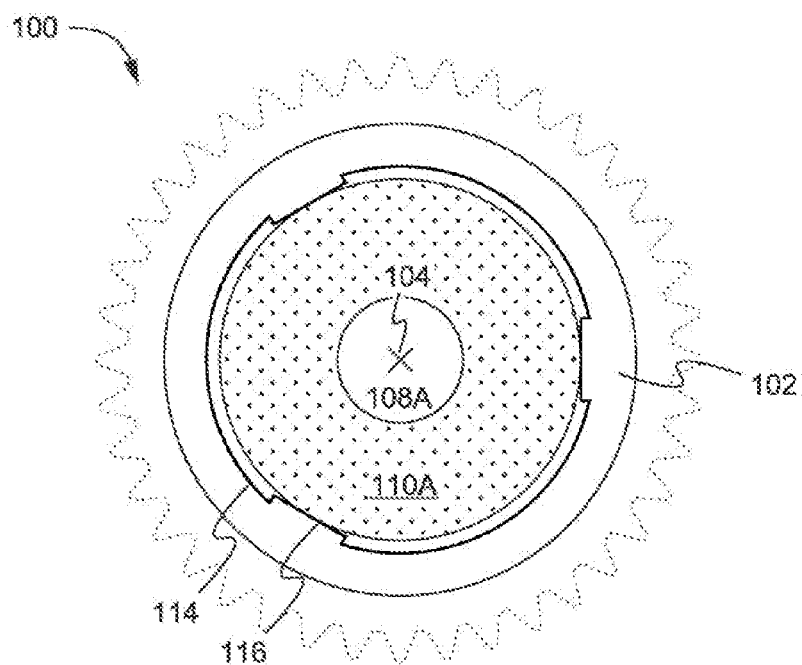
FIG. 3a shows a plan view of a further assembly comprising the gear and the sensor element to be fixed of FIGS. 1a to 1c.
Figure 3B:
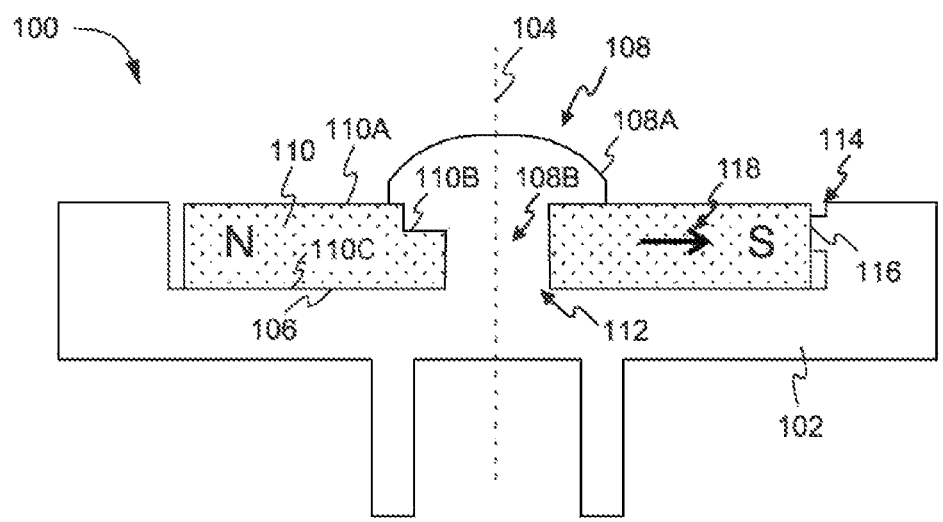

FIG. 1a, FIG. 1b, FIG. 1c, FIG. 2a, FIG. 2b and FIG. 3a, FIG. 3b schematically show various stages of the manufacture of an assembly 100 according to the present disclosure comprising a rotatable component 102 and a sensor element 110 fixed thereon according to an example. FIG. 1a and FIG. 1b show the sensor element 110 separate from the rotatable component 102 shown in FIG. 1c. In the representation in FIGS. 2a to 2b, the sensor element 110 is arranged on the rotatable component 102. In FIG. 3a, FIG. 3b, the completed assembly 100 is schematically shown, in which the sensor element 110 is fixed on the rotatable component 102 in a torsion-resistant manner.

FIG. 1a and FIG. 1b schematically shown the sensor element to be fixed according to an example, wherein FIG. 1a shows a plan view of the sensor element and FIG. 1b shows a cross-sectional view. In the example shown, the sensor element 110 to be fixed is diametrically magnetized cylindrical magnet, for example a rare-earth magnet, e.g. a sintered, pressed or injection-molded plastic-bonded neodymium-iron-boron magnet (NdFeB). This is cost-effectively available, which can improve the economy of manufacturing the assembly 100. After it has been fixed on the rotatable component 102, the magnet 110 can be used, for example, to determine a position of the rotatable component 102 and, in particular, an azimuthal angle position of the rotatable component 102 about its rotary axis 104. To do this, the orientation of the direction of magnetization 118 of the magnet 110 can be evaluated. In particular, the rotatable component 102 can be a gear of an actuating drive, and the position determined of the rotatable component 102 can be used to determine the position of an actuator coupled to the actuating drive.

Figure 6A:
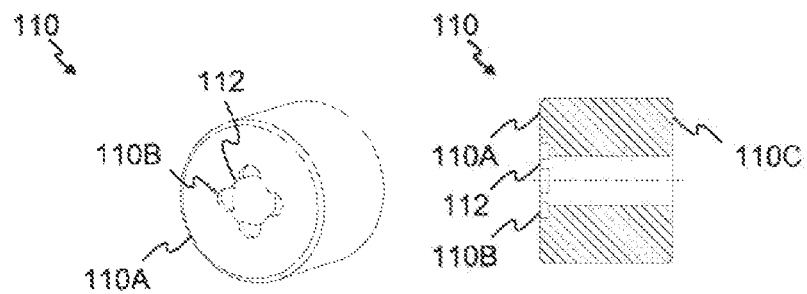
FIG. 6a shows a sensor element to be fixed comprising recesses according to an example.
Figure 6B:
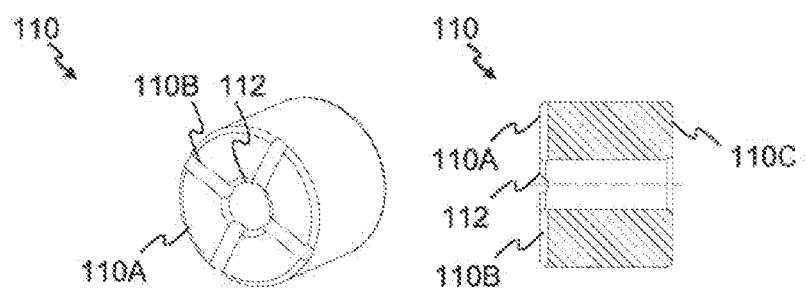
FIG. 6b shows a sensor element to be fixed comprising recesses according to another example.

The magnet 110 has an opening 112 and a surface 110A adjacent to the opening. In the example shown, the surface 110A adjacent to the opening is a top end face of the cylindrical magnet 110, the opening 112 has a round cross-section and extends through the magnet 110 starting from its top end face 110A, perpendicular to a bottom end face 110C on the opposite side on the cylindrical magnet 110. The magnet 110 can be cost-effectively made in this design, which can provide a cost advantage as against, for example, an opening having a shape without continuous rotation symmetry, such as square or hexagonal shape, to achieve torque-resistant fixing. The top end face 110A has one or more structures 110B, which can be recesses, in particular. The latter are configured, for example, as grooves or holes. In another example, the structure can also comprise, for example, ribs, projections or areas of high roughness. Some possible exemplary examples of the sensor element are schematically shown in FIG. 6a and FIG. 6b.

FIG. 1c schematically shows a cross-sectional view of a rotatable component 102 according to an exemplary example. In accordance with the example shown in FIG. 1a, FIG. 1b, FIG. 1c; FIG. 2a, FIG. 2b and FIG. 3a, FIG. 3b, the rotatable component 102 is a gear, for example for use in an actuating drive. In other examples, the rotatable component 102 can also be another component for an actuating drive, in particular, a rotor, a shaft or an actuator mechanically coupled to the rotor. The gear 102, at its outer circumference, has an annular toothing and is adapted to be rotated about a rotary axis 104, for example by rotatably supporting the gear 102 in a corresponding bearing or guide of the actuating drive. The gear 102 can have a diameter, for example, of between 10 mm and 100 mm perpendicular to the rotary axis 104, in one example a diameter of between 20 mm and 50 mm. Such a diameter can be advantageous for the use of the gear in a small motor. The gear 102 can be made, for example, of metal, for example of steel and/or aluminum, and/or of a hard plastic, for example a glass-fiber reinforced plastic, for example a polyamide having a glass fiber content of between 20% and 40%. In particular, the gear 102 can be made of a thermally deformable plastic. The gear 102 can have been made, for example, by means of a milling method, a casting method and/or an additive production method. In some examples, the entire gear 102 is integrally formed. In other examples, individual parts or elements can be retrofitted on the gear 102, for example adhesively glued thereto.

The gear 102 comprises a cavity 114 having a bottom surface 106. The bottom surface acts as a support surface 106 for the magnet 110. According to the exemplary example shown in FIG. 1a, FIG. 1b, FIG. 1c; FIG. 2a, FIG. 2b and FIG. 3a, FIG. 3b, the bottom surface 106 is a planar circular or annular surface. A fixing element 108 protrudes from the support surface 106 in parallel to the rotary axis 104. The fixing element 108 is integrally formed with the gear 102, and both consist of a thermally deformable plastic, which advantageously facilitates the deformation according to the present disclosure of a top portion 108A of the fixing element 108. The fixing element 108 extends along the rotary axis 104. As shown in FIG. 1c, or FIG. 2a, FIG. 2b, the fixing element can have a rotation-symmetrical form, in particular a cylindrical form, prior to the deformation of the fixing element 108. Moreover, the gear 102 has one or more locating surfaces 116 adapted for the magnet 110 to be placed or pressed against the locating surfaces.

FIG. 2a and FIG. 2b schematically show an assembly 100A after executing a first manufacturing step, namely arranging the magnet 110 on the support surface 106. FIG. 2a shows a plan view, FIG. 2b a cross-sectional view of the assembly 100A. When arranging the magnet 110 on the support surface 106, the fixing element 108 is introduced through opening 112 in magnet 110 so that the fixing element 108 penetrates the magnet 110. The magnet 110, with its lower end face 110C, can be supported on the support surface 106.

When arranging the magnet 110 on the support surface 106, it is placed in the cavity 114 in the gear 102. Moreover, the magnet 110 is placed or pressed against one or more locating surfaces 116. According to the exemplary example shown in FIG. 2a and FIG. 2b, the gear has three locating surfaces 116, against which the magnet 110 can be placed or pressed. In other examples, the gear can have one, two, four or more locating surfaces 116. The locating surfaces 116 can be sidewall portions protruding from the outer circumference of the cavity 114, for example three planar sections or projections distributed about circumference to establish a point-like contact or surface contact with the outer circumference of the magnet 110. In such examples, the inner diameter of the cavity 114 in the area of the locating surfaces 116 can be smaller than the inner diameter of the cavity 114 in the areas without locating surfaces 116. In particular, the locating surfaces 116 can be formed along the edge of the support surface 106. Alternatively, the locating surfaces can be arranged adjacent to the fixing element 108, about the fixing element, so that the magnet 110 is placed against the locating surfaces 116 in the area of the opening 112. In such examples, the outer diameter in the area of the locating surfaces 116 can be larger than the diameter of the fixing element 108.

In accordance with the example shown in FIG. 2b, the locating surfaces 116 are perpendicular to the support surface 106 and parallel to the rotary axis 104. In other examples, at least one of the locating surfaces 116 can be inclined with respect to the rotary axis 104 so that the internal dimension of the cavity 114 gets larger as the distance from the support surface 106 increases. This can facilitate the introduction of the magnet 110 into the cavity 114. The locating surfaces 116 can serve as a three-point support and/or can improve the precision of radially positioning the magnet 110 on the support surface 106. The locating surfaces 116 can also improve the radially backlash-free fixing of the magnet 110 on the gear 102, can serve as securing against tilting and, by providing a frictional engagement with magnet 110, can improve torque resistance, in particular, when the magnet 110, as shown in FIG. 3a, 3b, is fixed to the gear 102 by means of the fixing element 108.

FIG. 3a, 3b schematically show an assembly 100 according to the present disclosure, as it can be produced by a further manufacturing step, namely the deformation of a top portion 108A of the fixing element, from the assembly 100A in FIG. 2a, FIG. 2b. FIG. 3a shows a plan view, FIG. 3b a cross-sectional view of the assembly 100. After deformation, the width of the top portion 108A of the fixing element is larger than the width of the opening. This helps to fix the magnet on the gear 102 in the axial direction. When the top portion 108A of the fixing element is deformed, the material of the top portion 108A of the fixing element is introduced into the structure 1108 in the surface 110A of the sensor element 110 adjacent to the opening, for example into the recesses 1108.

For example, the top portion 108A of the fixing element is deformed by the application of force and/or heat. Hereby the top portion 108A of the fixing element can be at least partially plasticized. The plasticized material flows into the recess 1108 to create or improve an interlocking engagement. When the plasticized material cools down and solidifies, the interlocking engagement is fixed. Since the recess does not have a continuous rotation symmetry, the introduced material of the fixing element 108 creates a torque-resistant fixing of the magnet 110 on the gear 102. Moreover, the interlocking engagement can facilitate a backlash-free torque-resistant fixing.

In the assembly according to the present disclosure, a connection between the rotatable component 102 and the fixed sensor element 110 can be at least conditionally releasable. In this context, "conditionally releasable" means that the connection can be released by severing the top portion 108A of the fixing element without damaging other areas of the rotatable component or of the sensor element.

The method according to the disclosure, in which the magnet 110 is fixed by deforming the top portion 108A of the fixing element on the gear 102 is compatible with automated series production. This improves the economy of manufacturing the assembly 100. For example, cumbersome treatment and/or cleaning of the surfaces of the magnet 110 and the gear 102 can be avoided, which can become necessary for fixing the magnet 110 by means of adhesive gluing. The fixing element 108 and the gear 102 can be integrally formed to improve the stability and loading strength of the attachment of the magnet 110 on the gear 102.

Deforming the top portion 108A of the fixing element can be carried out, for example, by hot caulking or ultrasonic welding. Hot caulking can be carried out, for example, with the aid of a heated punch. In ultrasonic welding, a high-frequency mechanical vibration is transmitted to the top portion 108A of the fixing element, for example, by using a planar or point-shaped sonotrode. The frequency of the vibration can be, for example, in the range between 10 kHz and 40 kHz and may be, for example, 20 kHz.

The material of the magnet 110 and the material of the fixing element can be selected such that the deformation of the top portion 108A of the fixing element can be carried out by the application of a force or temperature at which the magnet 110 is not deformable or plasticizeable. In such examples, the magnet 110 and the gear 102 are separated by an interface. For example, the fixing element can comprise a thermally deformable plastic material and the magnet 110 can be a sintered or plastic-bonded magnet comprising, for example, an epoxy resin.

The magnet 110 can be pressed against the locating surface 116 while the top portion 108A of the fixing element is deformed and/or while the interlocking engagement is established between the top portion 108A of the fixing element and the top end face 110A of the magnet. In particular, the magnet 110 can be pressed against the locating surface 116 while plasticized material of the top portion 108A of the fixing element cools down and solidifies and fixes the interlocking engagement.

According to the exemplary example shown in FIG. 2a, FIG. 2b and FIG. 3a, FIG. 3b, a bottom portion 1088 of the fixing element is arranged within the opening 112. The bottom portion 1088 of the fixing element can be that part of the fixing element 108 which maintains its shape while the top portion 108A of the fixing element is deformed. The bottom portion 1088 of the fixing element is integrally formed with the gear 102 and the top portion 108A of the fixing element to connect the top portion 108A of the fixing element and thus the magnet 110 to the gear 102 with a high tensile strength along the axial direction. The bottom portion 1088 of the fixing element can have a smooth surface without interlocking connection to the opening so that the connection between the magnet 110 and the gear 102 is only established by the deformed top portion 108A of the fixing element. This avoids stresses within the magnet 110 and reduces the risk of the magnet 110 rupturing. In some examples, the bottom portion 1088 of the fixing element can be spaced from the opening 112.

Figure 4A:
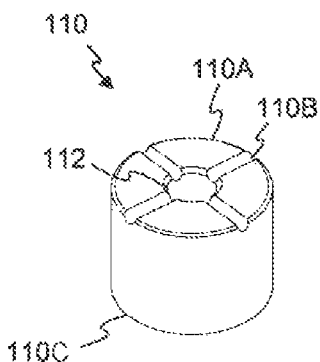
FIG. 4a shows a perspective view of a magnet according to an example.
Figure 4B:
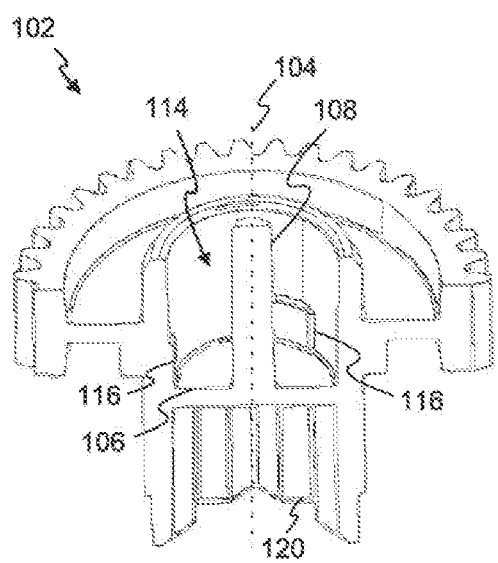
FIG. 4b shows a cross-sectional view of a gear according to an example.
Figure 4C:
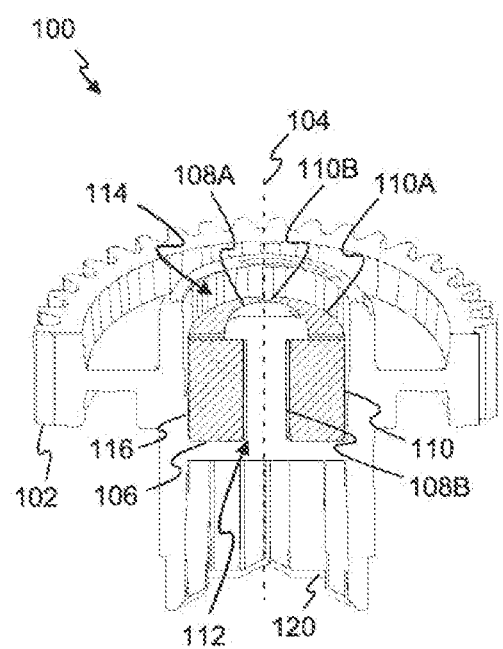
FIG. 4c shows a cross-sectional view of an assembly comprising the gear and the fixed magnet of FIGS. 4a and 4b.

FIGS. 4a and 4b schematically show a sensor element 110 to be fixed and a rotatable component 102. FIG. 4c shows an assembly 100 according to an example of the present disclosure after fixing the sensor element 110 of FIG. 4a on the rotatable component 102 of FIG. 4b. According to the present example, the rotatable component 102 is a gear of an actuating drive, in particular an output gear, and the sensor element 110 to be fixed is a magnet. The magnet 110 shown in FIG. 4a, as a structure 1108 on the top end face 110A, has four grooves 1108 radially extending from the opening in the magnet on the top end face 110A up to the outer periphery. Alternative examples can also comprise, for example, blind holes, ribs or rough areas, as structures 1108. Some possible exemplary examples of magnets 110 are schematically shown in FIG. 6a and FIG. 6b. The gear 102 can be similar to the gear 102 described with reference to FIG. 1c; FIG. 2a, FIG. 2b and FIG. 3a, FIG. 3b, and the magnet 110 can be similar to the magnet 110 described with reference to FIG. 1a, FIG. 1b; FIG. 2a, FIG. 2b and FIG. 3a, FIG. 3b.

The gear 102 shown in FIG. 4b comprises an output shaft 120 adapted to couple the gear 102 after installation in an actuating drive, in particular in an actuating drive with a small motor, to an actuating element. For example, coupling can be by means of an output shaft 120 having an engagement profile on its inside, such as the hexagonal profile shown in FIG. 4b. Alternatively, other engagement profiles, such as a square profile, are also possible. Other examples comprise an engagement profile on the outside of the output shaft 120.

The assembly 100 shown in FIG. 4c can be created by arranging the magnet 110 of FIG. 4a on the support surface 106 of the gear 102 and deforming the top portion 108A of the fixing element. The steps of arranging and deforming can be carried out in a way similar to the arranging and deforming of the example explained with reference to FIG. 1a, FIG. 1b, FIG. 1c; FIG. 2a, FIG. 2b and FIG. 3a, FIG. 3b and can comprise, for example, hot caulking and ultrasonic welding. In particular, in accordance with the exemplary example, when the top portion 108A of the fixing element is deformed, an interlocking engagement is established between the fixing element 108 and the top end face 110A of the magnet 110 to fix the magnet 110 on the gear 102 in a torque-resistant manner.

Also, in the present example, the gear 102 comprises a plurality of locating surfaces 116 configured as protrusions on the inside of the cavity 114 along the edge of the support surface 106. When the magnet 110 is arranged in the cavity 114, the side surface of the magnet 110 is placed against a plurality of protrusions 116. This can be facilitated by inclining the locating surfaces 116 away from the axis. In accordance with the exemplary example, the gear has three protrusions 116 so that a three-point contact can be established. During the deformation of the top portion 108A of the fixing element, the magnet 110 can be pressed against the locating surfaces. Alternative examples of the locating surfaces similar to the exemplary examples described with reference with FIG. 1a, FIG. 1b, FIG. 1c; FIG. 2a, FIG. 2b and FIG. 3a, FIG. 3b are also possible.

In accordance with the example of the assembly 100 shown in FIG. 4c, the magnet 110 is fully accommodated within the cavity 114. The top portion 108A of the fixing element protrudes above the surface 110A of the magnet adjacent to the opening and is also fully accommodated within the cavity 114. In other examples, the top end face 110A of the magnet is flush with the top edge of the cavity 114, or the magnet 110 protrudes from the cavity 114. The top portion 108A of the fixing element can be flush with the surface 110A of the magnet adjacent to the opening and/or with the top edge of the cavity 114.

Figure 5A:
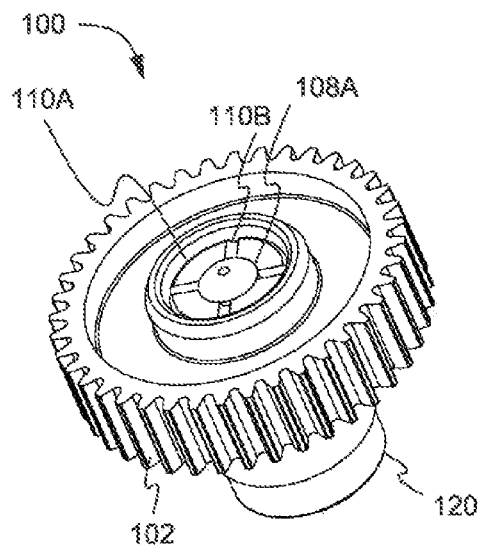
FIG. 5a shows a perspective view of an assembly comprising a gear and a fixed magnet according to an example.
Figure 5B:
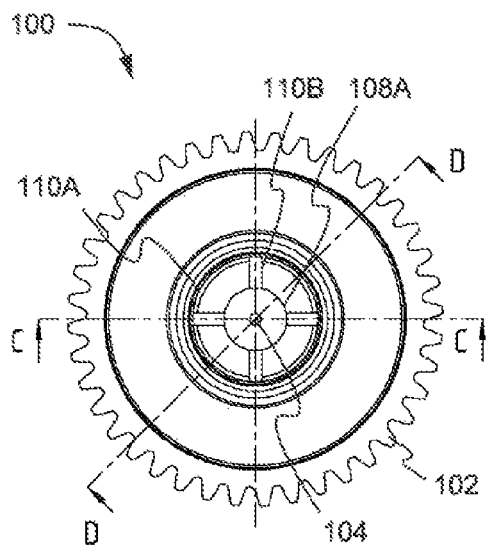
Figure 5C:
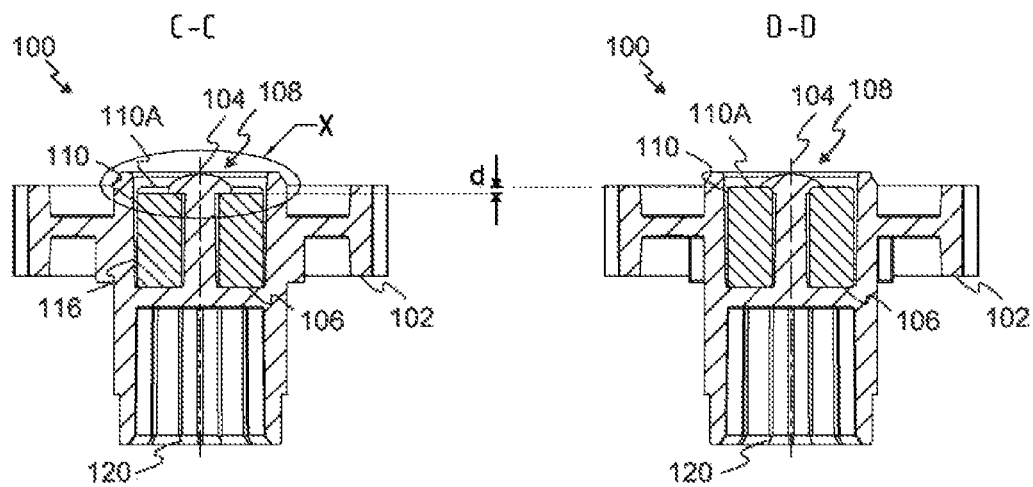
FIG. 5c shows a cross-section along the lines C-C and D-D shown in FIG. 5b of the assembly of FIGS. 5a and 5b.
Figure 5D:
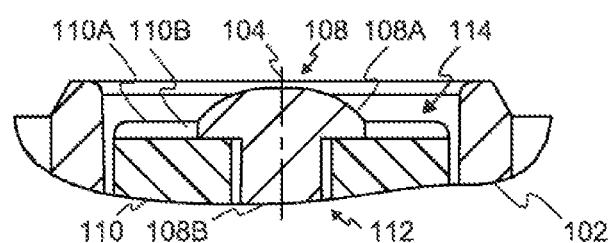
FIG. 5d shows a detail view of a detail X of FIG. 5c.

FIG. 5a, FIG. 5b, FIG. 5c, FIG. 5d show an assembly 100 comprising a gear 102 and a fixed magnet 110 according to an example. The assembly 100 can be similar to the one shown in FIG. 4c. FIG. 5a shows the assembly 100 in a perspective view, and FIG. 5b shows a plan view. FIG. 5c shows cross-sections along lines C-C and D-D of FIG. 5b. FIG. 5d is an enlarged view of a detail X of FIG. 5c.

Figure 7:
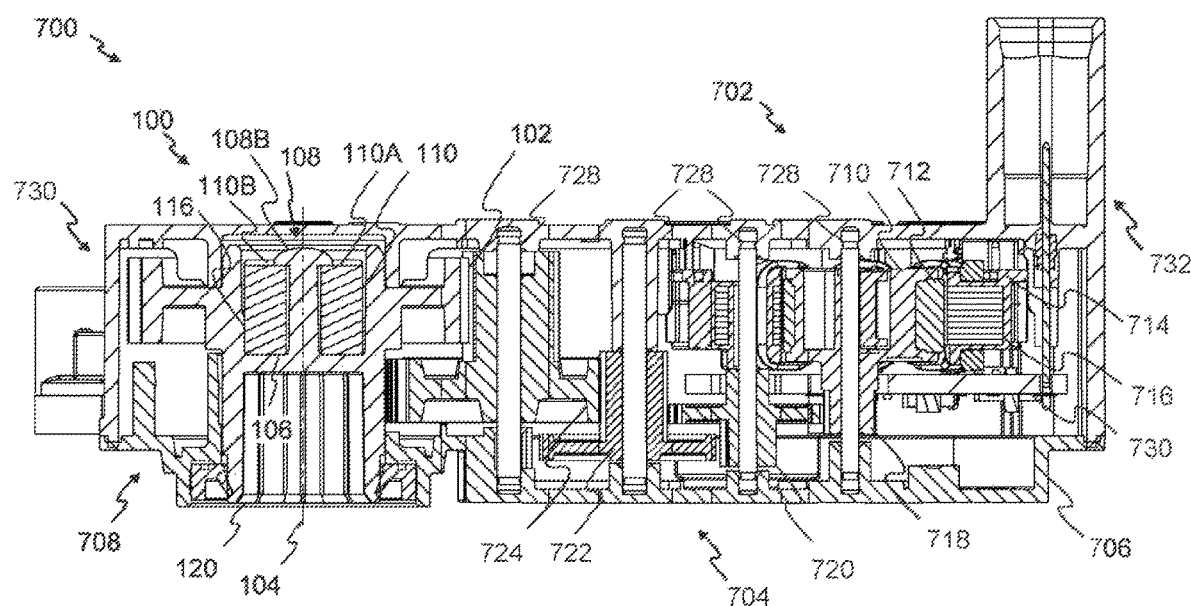
FIG. 7 shows an actuating drive comprising an electric motor, and comprising a gear, a fixed magnet and a Hall sensor for determining the azimuthal angle position of the gear.

In the present example, the gear 102 is an output gear of an actuating drive, for example the actuating drive 700 of FIG. 7. The output gear 102 can be formed similar to the gear of FIG. 1c and/or FIG. 4a, FIG. 4b, the magnet 110 can be similar to the magnet 110 of FIG. 1a, FIG. 1b and/or FIG. 4a, FIG. 4b. In accordance with the exemplary example shown in FIG. 5a, FIG. 5b, FIG. 5c, FIG. 5d, the top end face 110A of the magnet comprises a structure having four grooves 1108 radially extending starting from the opening in the magnet on the top end face 110A outwards up to its edge.

The depth d of the grooves 1108 is, for example, in the range of 0.1 mm to 0.5 mm. The top portion 108A of the fixing element is in interlocking engagement with the top end face 110A on the grooves 1108. The connection and the interlocking engagement can be created by arranging the magnet 110 on the support surface 106 and deforming the top portion 108A of the fixing element in a manner similar to that described for the exemplary examples with reference to FIG. 1a, FIG. 1b, FIG. 1c, FIG. 2a, FIG. 2b, FIG. 3a, FIG. 3b and/or FIG. 4a, FIG. 4b, FIG. 4c. The grooves 1108 form recesses without continuous rotation symmetry about the rotary axis 104, and the interlocking engagement between the top portion 108A of the fixing element and the grooves serves as a torque-resistant connection of the magnet 110 about the rotary axis 104. The magnet 110 can thus be fixed on the gear 102 in a torque-resistant manner. Moreover, the gear 102 according to the exemplary example shown in FIG. 5a, FIG. 5b, FIG. 5c, FIG. 5d, comprises a plurality of locating surfaces 116. The cylindrical magnet 110, with its peripheral surface, is in contact with the locating surfaces 116. The interlocking engagement of the top portion 108A of the fixing element with the magnet 110 presses the magnet against the locating surfaces 116 to facilitate radial and axial fixing of the magnet 110.

FIG. 6a and FIG. 6b show various examples of the magnet 110. The shape of the magnets 110 in FIG. 6a and FIG. 6b is cylindrical and similar to that of the magnets 110 of FIG. 1a, FIG. 2a, FIG. 2b, FIG. 3a, FIG. 3b and FIG. 4a, FIG. 4c. The magnets 110 can have heights in the range of 1 mm to 30 mm, in particular of 4 mm to 15 mm. The top end face 110A and/or the bottom end face 110C can have diameters in the range of 1 mm to 40 mm, in particular of 5 mm to 20 mm. These dimensions can advantageously facilitate their use in small motors.

In the examples shown, the structure 1108 in the surface 110A of the magnet 110 adjacent to the opening 112, is adjacent to the opening. This helps to effectively introduce material into the structure 110B during the deformation of the top portion 108A of the fixing element. In accordance with the example of FIG. 6a, the structure, with the recesses 110B in the top end face 110A of the magnet 110, comprises a plurality of blind holes arranged along a circumferential direction about the opening 112 of the magnet 110. The blind holes can have diameters in the range of 1 to 2 mm and can have depths in the range of 0.1 to 0.5 mm to enable a strong torque-resistant fixing of the magnet 110 on the gear 102 when material of the fixing element is received. Blind holes 110B can be cost-effectively produced in the context of automated series production, for example, by means of drilling. In accordance with the example of FIG. 6b, the recesses 110B in the top end face 110A of the magnet 110 are a plurality of grooves. According to this example, the grooves 110B extend radially outwardly on the top end face 110A of the magnet 110 starting from the opening 112. The grooves 110B also extend from one edge of the top end face 110A to a diametrically opposite edge of the top end face 110A. The grooves can have, for example, depths in range of 0.1 to 0.5 mm, and widths in the range of 0.5 mm to 2 mm. While having the same volume, grooves can provide, for example, a larger surface than blind holes and thus improve the connection between the top portion 108A of the fixing element and the top end face 110A of the sensor element. In particular, the proportion of the edge which extends in the radial direction, can be larger, and thus the torque-resistance, i. e. the resistance of the connection along the azimuthal direction perpendicular to the radially extending edges, can be improved.

Other examples of the sensor element to be fixed can have structures 110B in the surface 110A adjacent to the opening 112, which are configured as ribs, projections or roughened regions.

FIG. 7 shows an example of an actuating drive 700 comprising an electric motor 702 and an assembly 100 according to the present disclosure comprising a gear 102 and a fixed magnet 110, in the present example, the assembly 100 of FIG. 4c or FIG. 5a. The electric motor 702 of the actuating drive 700 can be, for example, a small electric motor, in particular, as shown, a brushless DC motor. The electric motor 702 has a rotatably supported rotor 710 comprising one or more permanent magnets 712, and a stator 714. The stator 714 can have a plurality of phase windings 716 adapted to generate a time-dependent magnetic field to set the rotor 710 in motion. In particular, the electric motor 702 can be configured as a brushless DC motor comprising three phase windings 716 or as a stepper motor comprising two phase windings.

The rotor 710 of the electric motor 702 is mechanically coupled to the output gear 102 of the assembly 100 via a transmission 704 so that a movement of the rotor 710 is converted to a rotary motion of the output gear 102. The transmission 704 can comprise, for example, a spur gear and/or a worm gear and can be formed, in particular, as a speed reduction transmission. The transmission is driven by an input gear 718 of the rotor 710. In the present example, the transmission comprises three intermediate gears 720, 722 and 724 which transmit the rotation between the rotor 710 and the output gear 102. The actuating drive 700 further comprises a housing 706 in which the electric motor 702, the transmission 704 and the assembly 100 are arranged. The rotor 710 and the intermediate gears 720, 722 and 724 are rotatably supported on axes 728, wherein the axes 728 are arranged and supported in shaped features on a housing inner surface. An output shaft 120 of the output gear 102 is arranged in an opening in the housing 706 so that an actuating element (not shown) situated outside of the actuating drive 700 can be mechanically coupled to an engagement profile of the output shaft 102.

The actuating drive 700 can further comprise a magnetic-field sensor 708 as well as the control unit (not shown), wherein the magnetic-field sensor 708 is arranged in the vicinity of the magnet 110 fixed on the output gear 102 and adapted to determine a strength and/or direction of the magnetic field generated by the magnet 110. The magnetic-field sensor 708 can be, for example, a two- or three-dimensional Hall sensor adapted to measure the strength of the magnetic field along two and three axes, respectively. The actuating drive 700 can be adapted to determine the position of the output gear 102 or of an actuating element coupled therewith based on a sensor signal output by the magnetic-field sensor 708, for example by means of a corresponding calibration curve. The magnetic-field sensor 708 can be arranged, in particular, on a printed circuit board 730 which extends from the stator 714 to the output gear 102. The magnetic-field sensor 708 is advantageously arranged in the vicinity of the output gear 102. The printed circuit board 730 of the present example further comprises a microcontroller as a control unit. Furthermore, the printed circuit board is arranged in a plane perpendicular to the rotary axis of the rotor 710, wherein the printed circuit board 730 is in a horizontal posture above the stator 714 and comprises an opening through which the input gear 718 of the rotor 710 extends. The control circuit situated on the printed circuit board can be electrically contacted via a plug connector 732.

Figure 8:
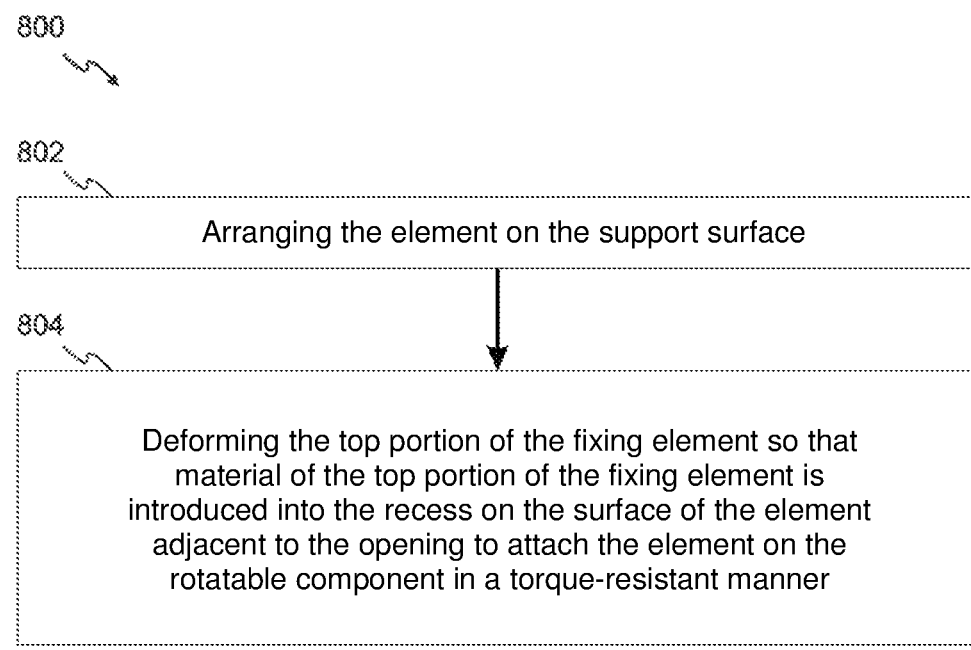
FIG. 8 shows a flow diagram of a method of fixing a sensor element on a component rotatable about a rotary axis of an actuating drive according to an example.

FIG. 8 shows a flow diagram of a method 800 for attaching a sensor element on a rotatable component for an actuating drive according to an example. The method 800 can be used, for example, to produce the assembly 100 of FIG. 3a, FIG. 3b, FIG. 4c or FIG. 5a comprising the gear 102 and the magnet 110. The assembly 100 of FIG. 4c will be used in the following for exemplary illustration of the steps of the method 800. However, this is not to be construed as a limitation, and the method 800 could also be used to attach other sensor elements on rotatable components of an actuating drive.

The method 800 comprises a step 802 of arranging the magnet 110 on the support surface 106 of the gear 102. Herein, the fixing element 108, which protrudes from the support surface 106 in parallel to the rotary axis of the gear 102, introduced through the opening 112 in the magnet 110. Arranging 802 the magnet can be carried out, for example, as described with reference to the examples shown in FIG. 1a, FIG. 1b and FIG. 1c. The magnet 110 can be inserted in the cavity 114 in the gear 102. The gear 102 can further comprise one or more locating surfaces 116. When arranging 802 the magnet 110 on the support surface 106, the magnet 110 can be placed against at least one of the locating surfaces 116. In a second step, the method 800 comprises deforming 804 the top portion 108A of the fixing element. Deforming 804 is carried out in such a manner that material of the top portion 108A of the fixing element is introduced into the recess 110B in the top end face 110A. In particular, deforming 804 of the top portion 108A of the fixing element can be carried out while applying force and/or heat, for example in such a manner that at least part of the top portion 108A of the fixing element plasticizes during deformation 804 and can be more easily introduced into the recess by flowing. Deforming 804 of the top portion 108A of the fixing element can be carried out, for example, as described with reference to the examples shown in FIG. 1a, FIG. 1b and FIG. 1c and can comprise hot caulking or ultrasonic welding. In particular, the material of the fixing element 108 and the material of the magnet 110 can be chosen such that the magnet 110 is not deformed and is not plasticized during deforming 804. This can help to minimize stresses within the magnet. The risk of the magnet 110 rupturing is thus reduced.

The recess 110B does not have continuous rotation symmetry, for example, it can comprise aligned holes or grooves as shown in FIG. 6a or FIG. 6b. By material of the fixing element being introduced into the recess 110B during deforming 804 of the fixing element 108, the magnet 110 is attached on the gear 102 in a torque-resistant manner. Deforming 804 establishes, for example, an interlocking engagement between the top portion 108A of the fixing element and the top end face 110A of the magnet 110, in particular with the recess 110B. In particular, the interlocking engagement can be fixed during cooling and solidifying of plasticized material of the top portion 108A of the fixing element. The interlocking engagement improves the torque resistance. The fixing element 108 and the gear 102 can be integrally formed to improve the stability and loading strength of the assembly 100. Furthermore, pressing the magnet 110 against the locating surface 116 during the deformation of the top portion 108A of the fixing element can improve the rotation resistance of the magnet 110 about the rotary axis 104, the axially and radially backlash-free attachment of the magnet 110 on the gear 102, and securing the magnet 110 against tilting with respect to the rotary axis 104.

The magnet 110 has an axis of magnetization 118. During arranging 802 of the magnet 110 on the support surface 106, the axis of magnetization 118 can be aligned. This can facilitate or even avoid calibration when determining the position of the gear 102.

In addition to the steps 802, 804 shown in FIG. 8, the method 800 can comprise further steps in some examples, for example, arranging the gear 102 in an actuating drive, for example, the actuating drive 700 of FIG. 7. The gear 102 can be arranged in the actuating drive 700 in such a way that the magnet 110 is arranged in the vicinity of a magnetic-field sensor, for example a Hall sensor 708, as shown in FIG. 7. The magnetic-field sensor 708 can be adapted to determine the direction of magnetization 118 of the magnet 110 and, with the aid of this information, the azimuthal angle position of the gear 102. This enables determining the position of an actuating element, in particular a valve.

The examples according to the present disclosure and the figures described here purely serve for exemplary illustration. The disclosure can vary in its design without changing the basic functioning principle. The scope of protection of the method according to the disclosure and the apparatus according to the disclosure are solely derived from the appended claims.

LIST OF REFERENCE NUMERALS

100—assembly
102—gear/output gear
104—rotary axis
106—support surface
108—fixing element
108A—top portion of fixing element 108
108B—bottom portion of fixing element 108
110—magnet
110A—surface adjacent to opening 112
110B—recess in surface 110A adjacent to the opening
110C—bottom end face of the magnet
112—opening
114—cavity
116—locating surface
118—direction of magnetization
120—output shaft of gear
d—depth of recess 110B
700—actuating drive
702—electric motor
704—transmission
706—housing
708—Hall sensor
710—rotor
712—permanent magnets
714—stator
716—phase windings
718—input gear
720, 722, 724—intermediate gears
728—axes
730—printed circuit board
732—plug connector
800—method for attaching a sensor element on a rotatable component
802—arranging the sensor element on the support surface
804—deforming a top portion of the fixing element

What is claimed is:

1. An actuating drive, comprising:
an electric motor;
an assembly comprising:
a gear rotatable about a rotary axis having a support surface and a fixing element protruding from said support surface parallel to said rotary axis, and
a magnet attached to the gear, having an opening and a surface adjacent to said opening, wherein said surface has a structure,
wherein the magnet is arranged on the support surface in such a manner that the fixing element penetrates the opening, and a top portion of the fixing element is in interlocking engagement with the structure so that the magnet is attached to the gear in a torque-resistant manner; and
a Hall sensor adapted to obtain information on an azimuthal angle position of the gear.

2. The actuating drive according to claim 1, wherein the gear is integrally formed with a hollow shaft and the magnet is arranged within the hollow shaft.

3. The actuating drive according to claim 2, wherein the magnet is arranged in a first axial portion of the hollow shaft and wherein the hollow shaft comprises a second axial portion for coupling to an actuating element.

4. The actuating drive according to claim 1, wherein the structure of the surface adjacent to the opening of the magnet further comprises a recess which does not have a continuous rotation symmetry about the rotary axis which interlocking engages the top portion of the fixing element.

5. The actuating drive according to claim 4, where in the recess comprises one or more blind holes to further engage the top portion of the fixing element.

6. The actuating drive according to claim 4, wherein the recess comprises one or more grooves to further engage the top portion of the fixing element.

7. The actuating drive according to claim 1, wherein the opening of the magnet has a circular cross-section.

8. The actuating drive according to claim 1, wherein the gear further comprises a locating surface that is inclined with respect to the support surface and in contact with the magnet so as to improve aid the positioning of the magnet on the support surface.

9. The actuating drive according to claim 1, wherein the magnet is diametrically magnetized.

10. The actuating drive according to claim 1, wherein the magnet is a rare-earth magnet.

11. The actuating drive according to claim 10, wherein the magnet is a neodymium-iron-boron magnet.

* * * * *